UNITED STATES PATENT OFFICE.

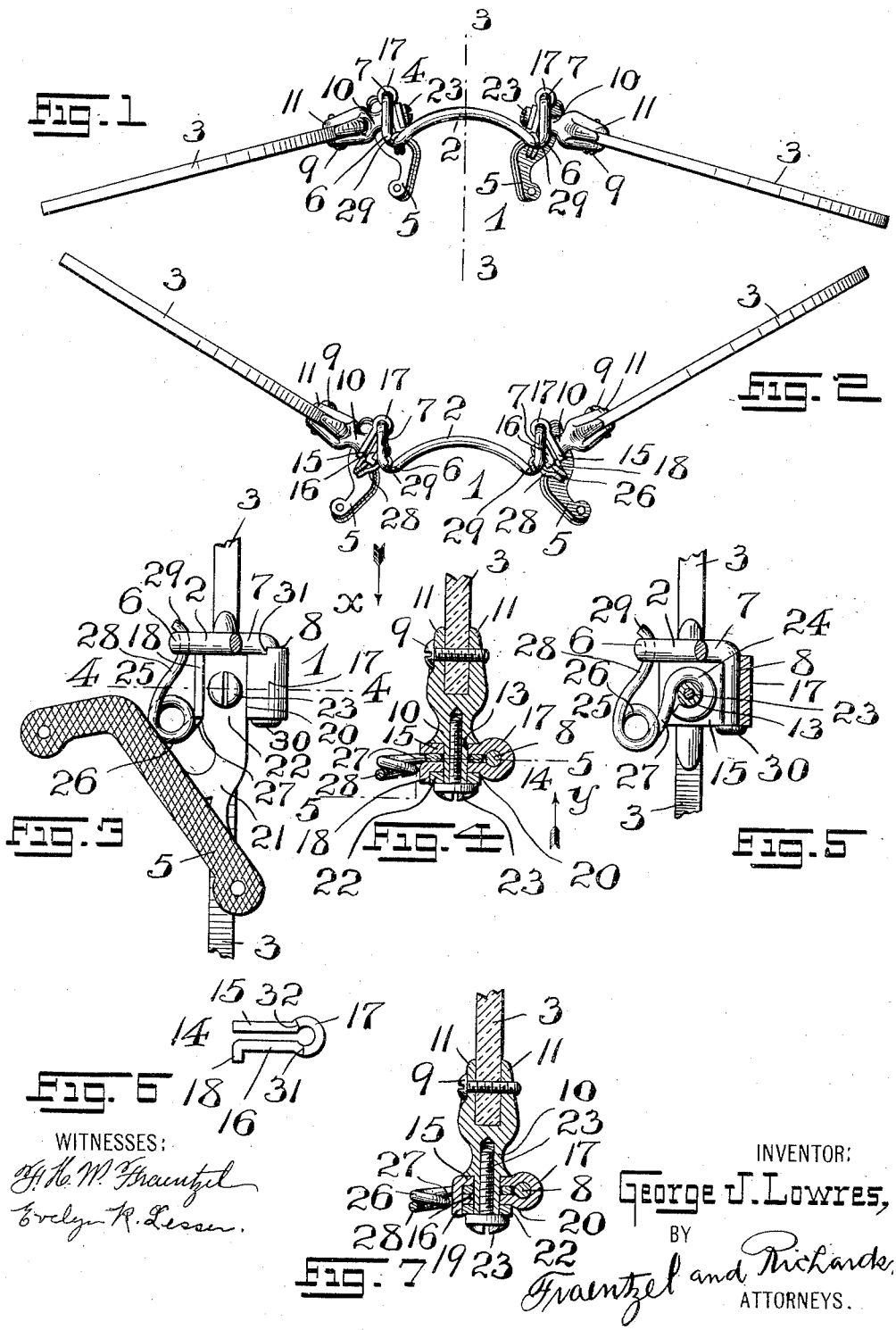

GEORGE J. LOWRES, OF NEWARK, NEW JERSEY, ASSIGNOR TO LOWRES OPTICAL CO., A CORPORATION OF NEW JERSEY.

EYEGLASSES.

No. 890,779.

Specification of Letters Patent.

Patented June 16, 1908.

Original applications filed November 27, 1906, Serial No. 345,279, and May 18, 1907, Serial No. 374,439. Divided and this application filed October 30, 1907. Serial No. 399,824.

*To all whom it may concern:*

Be it known that I, GEORGE J. LOWRES, a citizen of the United States, residing at Newark, in the county of Essex and State of New Jersey, have invented certain new and useful Improvements in Eyeglasses; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in eye-glasses; and the same is in the nature of a division of my former application for a patent for improvements in mountings for eye-glasses, filed Nov. 27, 1906, Serial No. 345,279, and also of my former application for improvements in mountings for eye glasses, filed May 18, 1907, Serial No. 374,439, such mountings being in the general form of a nose-bridge or support, with the end-portions of which the respective lenses are connected in a pivotal or oscillatory relation, by means of the eye-glass studs and their boxes, so that each lens is capable of a separate pivotal movement, centrally about its axis of pivotal connection with the end-portion of the nose-bridge or support, the respective nose-plates or guards, while having a rigidly fixed relation to their respective lenses and the studs and their boxes, being capable of oscillatory movements in opposite directions with relation to each other, and about the points of pivotal connection at the respective end-portions of the nose-bridge or support.

In the fitting of eye-glasses, as is well-known to opticians, it is essential for the best results that not only should the focal center of each lens coincide with the pupil of the eye, but also that the major or horizontal axis should, when the glasses are arranged upon the nose, register in parallelism with the major axis of the eye-ball; and, furthermore, it is essential, that the holding-portions of the nose-plates or guards should bear upon the opposite sides of the nose with the least possible pressure, and still hold, to obviate any discomfort and pain to the wearer of the glasses.

This invention, therefore, has for its principal object to provide a novel mounting for eye-glasses having the above stated purposes constantly in view; and, moreover, this invention has for its further object to provide a simple arrangement of bridge-piece adapted to rest directly upon the nose, in place of the usual connecting bar - spring, said nose-bridge being provided at its respective end-portions with pivots with which the respective lenses by means of their studs are pivotally connected, said studs and their boxes, as well as their respective nose-guards being spring-controlled, substantially as hereinafter more fully set forth, whereby the major or horizontal axes of the two lenses are angularly disposed, upon the inner side of the eye-glasses, and out of the parallelism with the major axes of the eye-balls; but when placed upon the nose, all the parts which are pivotally connected with the pivot-portions of the ends of the nose-bridge or support, moving outwardly so as to bring the major axes of the lenses into such parallelism with the major axes of the eye-balls, the nose-guards or plates at the same time moving in out-ward directions, all to the great comfort and benefit of the wearer of the glasses, and less liability of abrading the skin and preventing the resulting soreness of the nose.

Other objects of this invention not at this time more particularly enumerated will be clearly evident from the following detailed description of the same.

With the various objects of my present invention in view, the invention consists, primarily, in the novel eye-glasses hereinafter set forth; and, furthermore, this invention consists in the novel arrangements and combinations of the various devices and parts, as well as in the details of the construction of the same, all of which will be hereinafter more fully described, and then finally embodied in the clauses of the claims which are appended to and which form an essential part of the specification.

The invention is clearly illustrated in the accompanying drawings, in which:

Figure 1 is a top-edge view of a pair of eye-glasses embodying the principles of this invention, the parts being shown in their normally angular initial positions with relation to the rigid nose-bridge, before the arrangement of the eye-glasses in position upon the nose; and Fig. 2 is a similar view of the same parts, showing the lenses and the pivotal supports moved into an outward angular relation, prior to the adjustment or placing of the eyeglasses in position upon the nose, both of said views being made on an exaggerated scale. Fig. 3 is a detail sectional representation, taken on line 3—3 in said Fig. 1, but on a still further enlarged scale, with the lens represented in part only; and said view showing in elevation the lens-support and one form of nose-plate or guard, with the spring for retaining the lens and lens-support in their normal initial positions indicated in said Fig. 1. Fig. 4 is a horizontal section taken on line 4—4 in said Fig. 3, looking in the direction of the arrow $x$, the nose-plate or guard being omitted from said view. Fig. 5 is a sectional representation of said parts, said section being taken on line 5—5 in said Fig. 4, looking in the direction of the arrow $y$; and Fig. 6 is a top-edge view of one form of the pivotal support between the lens and the nose-piece. Fig. 7 is a view similar to that shown in said Fig. 4, but of a slightly modified construction.

Similar characters of reference are employed in all of the above described views, to indicate corresponding parts.

Referring now to the several figures of the drawings, the reference-character 1 indicates the complete mounting, and the same comprises a suitably bent or curved nose-bridge or support 2, the lenses 3, the lens-support 4, and the nose-plates or guards 5, all being arranged substantially in a manner to be hereinafter more particularly described.

The nose-bridge or support 2, as will be seen more especially from Figs. 1 and 2 of the drawings, is usually made in the form of a wire-bar, and is suitably bent at its ends, as at 6, to provide holding-portions, forwardly projecting members 7 extending from said bent portions 6. The said members 7 are substantially in the same horizontal plane of the nose-bridge 2, and at its free end each member 7 is formed with a downwardly extending and substantially right-angled pivot-post or element 8. Suitably secured upon the edge of each lens 3, by means of a screw 9 and the stud-straps 11, is a stud 10, each stud being preferably made with a shank-like member 13 upon which is arranged an element 14, which may be termed a box. This element 14 is made, preferably, in the manner illustrated more particularly in Figs. 4, 6 and 7 of the drawings, in which case it consists, essentially of a pair of perforated plates 15 and 16 fitted over said shank 13, said plates being doubled upon each other substantially in the manner shown, so as to provide at their doubled-over edge a sleeve-like bearing or pivot-receiving member 17. As indicated in Fig. 4, the plate 16 may be provided with a right-angled projection or shoulder 18; or, if desired, the other plate 15 may be provided with a right-angled projection or shoulder 19 which projects beyond the edge of the plate 16 substantially in the manner indicated in said Fig. 7 of the drawings. These projections 18 and 19 with the outwardly extending surface-portions 20 of the sleeves or pivot-members 17 provide receiving spaces into which the free-end-portions of the shanks 13 extend, to receive the perforated end-portions 22 of the members 21 of the nose-plates or guards, the said shoulders and the projecting surface-portions of the sleeves or pivot-members 17 preventing said end-portions 22 from turning upon their shanks 13, as will be clearly evident. Suitable screws 23 are employed for suitably securing the parts in their assembled relations.

Suitably arranged between each pair of flat-faces of said plates 15 and 16, and encircling the shank 13, is an eye-portion or loop 24 of a spring 25, said spring consisting, preferably, of a single coil 26, provided with one leg or element 27 of which the loop 24 forms a part, and with another leg or element 28 which extends in an upward direction and has its end-portion 29, which is preferably bent or curved, as shown, arranged in retaining engagement with a holding-portion 6 of the nose-bridge or support 2, substantially in the manner illustrated.

From an inspection of said Figs. 4 and 7 of the drawings, it will be clearly evident, that when the screw 23 is tightened the eye-portion or loop 24 of the substantially flat spring is firmly clamped between and secured against displacement from the said plates 15 and 16, and each lens is pivotally connected by the lens-supports thus provided with each pivotal-post or element 8 of the nose-piece or support 2, so as to swing horizontally with relation to the vertical plane of said nose-bridge or support 2. At the same time, the said nose-plates or guards 5 being directly connected with said lens-supports, the outward movements of the lenses and their supports, also cause similar movements in outward directions, of said nose-plates or guards, whereby the eye-glasses are readily adjusted in their wearing positions upon the nose, without discomfort and without abrading the skin. That the said sleeves or pivot-members are secured in their rotative positions upon said pivot-posts 8 against any vertical displacement, the lower free end-portion of each post or element 8 is preferably made to project beneath the lower open end-portion of each sleeve or pivot-member, and is provided with a slight head or "riveted-over" end 30, as clearly illustrated in Figs. 3 and 5 of the drawings. Each sleeve or pivot-receiving member 17, if desired, may also be provided with a pair of shoulders or stops 31 and 32, with which the forwardly projecting members 7 of the nose-bridge or support 2 are brought in retaining engagement to limit the oscillatory movements of the parts, as will be clearly understood.

I claim:

1. A mounting for eye-glasses comprising a rigid nose-bridge, provided at its ends with pivot-members, a lens-support pivotally connected with each pivot-member, a nose-plate or guard extending from each lens-support, said lens-support being provided with a shank, and a lens connected with each lens-support, all arranged to permit of an oscillatory movement of said lenses and said nose-plates simultaneously therewith in outward directions from the normal initial positions of said lenses and said nose-plates, the pivotal movement of each nose-plate being at one end of the same in contra-distinction to a pivotal movement of the nose-plate at a point midway between its respective ends, and means for producing such pivotal movements of the lenses, consisting of springs, each spring comprising a coil, a pair of upwardly extending end-members, and a loop on one of said members, said loop encircling said shank, and the other end-member of said spring bearing upon the rigid nose-bridge.

2. A mounting for eye-glasses comprising a rigid nose-bridge provided at its ends with pivot-members, a lens-support pivotally connected with each pivot-member, a nose-plate or guard extending from each lens-support, said lens-support being provided with a shank, and a lens connected with each lens-support, all arranged to permit of an oscillatory movement of said lenses and said nose-plates simultaneously therewith in outward directions from the normal initial positions of said lenses and said nose-plates, the pivotal movement of each nose-plate being at one end of the same in contra-distinction to a pivotal movement of the nose-plate at a point midway between its respective ends, and means for producing such pivotal movements of the lenses, consisting of springs, each spring comprising a coil, a pair of upwardly extending end-members, and a loop on one of said members, said loop encircling said shank, and the other end-member of said spring bearing upon the rigid nose-bridge, and means on said lens-supports for limiting the oscillatory movements of said parts.

3. A mounting for eye-glasses comprising a rigid nose-bridge, provided at its ends with pivot-members, a spring-controlled lens-support pivotally connected with each pivot-member, a nose-plate or guard extending from each lens-support, said lens-support being provided with a shank, and a lens connected with each lens-support, all arranged to permit of an oscillatory movement of said lenses and said nose-plates simultaneously therewith in outward directions from the normal initial positions of said lenses and said nose-plates, the pivotal movement of said nose-plates, the pivotal movement of each nose-plate being at one end of the same in contra-distinction to a pivotal movement of the nose-plate at a point midway between its respective ends, and means for producing such pivotal movements of the lenses, consisting of springs, each spring comprising a coil, a pair of upwardly extending end-members, and a loop on one of said members, said loop encircling said shank, and the other end-member of said spring bearing upon the rigid nose-bridge.

4. A mounting for eye-glasses comprising a rigid nose-bridge, provided at its ends with pivot-members, a spring-controlled lens-support pivotally connected with each pivot-member, a nose-plate or guard extending from each lens-support, said lens-support being provided with a shank, and a lens connected with each lens-support, all arranged to permit of an oscillatory movement of said lenses and said nose-plates simultaneously therewith in outward directions from the normal initial positions of said lenses and said nose-plates, the pivotal movement of each nose-plate being at one end of the same in contra-distinction to a pivotal movement of the nose-plate at a point midway between its respective ends, and means for producing such pivotal movements of the lenses, consisting of springs, each spring comprising a coil, a pair of upwardly extending end-members, and a loop on one of said members, said loop encircling said shank, and the other end-member of said spring bearing upon the rigid nose-bridge, and means on said lens-supports for limiting the oscillatory movements of said parts.

5. A mounting for eye-glasses comprising a nose-bridge, a forwardly projecting member at each end of said nose-bridge, and a downwardly extending pivot-post connected with each member, a pair of lens-studs, a lens carried by each stud, a shank on each stud, each shank being provided with a screw-threaded socket, an element mounted upon each shank, each element comprising a pair of plates and a sleeve-like bearing, each bearing being adapted to be mounted upon one of said pivot-posts, a pair of springs, each spring having an end-portion clamped between said plates and a loop on said end-portion encircling the shank of the stud, and each spring having another end-portion in engagement with a part of the nose-bridge, and a screw screwed into the receiving socket of each stud for securing said parts in their assembled relation, substantially as and for the purposes set forth.

6. A mounting for eye-glasses comprising a nose-bridge, a forwardly projecting member at each end of said nose-bridge, and a downwardly extending pivot-post connected with each member, a pair of lens-studs, a lens carried by each stud, a shank on each stud, each shank being provided with a screw-threaded socket, an element mounted upon each shank, each element comprising a pair of plates and a sleeve-like bearing, each bearing being adapted to be mounted upon one of said pivot-posts, a pair of springs, each spring having an end-portion clamped between said plates and a loop on said end-portion encircling the shank of the stud, and each spring having another end-portion in engagement with a part of the nose-bridge, and a screw screwed into the receiving socket of each stud for securing said parts in their assembled relation, and each sleeve-like bearing being provided with stops to limit the movements of the parts, substantially as and for the purposes set forth.

7. A mounting for eye-glasses comprising a nose-bridge, a forwardly projecting member at each end of said nose-bridge, and a downwardly extending pivot-post connected with each member, a pair of lens-studs, a lens carried by each stud, a shank on each stud, each shank being provided with a screw-threaded socket, an element mounted upon each shank, each element comprising a pair of plates and a sleeve-like bearing, each bearing being adapted to be mounted upon one of said pivot-posts, a right-angled projection on one of said plates, each projection and part of each sleeve-like bearing providing a box or receiving space on each lens-stud, a pair of nose-plates, each nose-plate having a portion extending into a receiving space, a pair of springs, each spring having an end-portion clamped between said plates and a loop on said end-portion encircling the shank of the stud, and each spring having another end-portion in engagement with a part of the nose-bridge, and a screw screwed into the receiving socket of each stud for securing all of said parts in their assembled relation, substantially as and for the purposes set forth.

8. A mounting for eye-glasses comprising a nose-bridge, a forwardly projecting member at each end of said nose-bridge and a downwardly extending pivot-post connected with each member, a pair of lens-studs, a lens carried by each stud, a shank on each stud, each shank being provided with a screw-threaded socket, an element mounted upon each shank, each element comprising a pair of plates and a sleeve-like bearing, each bearing being adapted to be mounted upon one of said pivot-posts, a right-angled projection on one of said plates, each projection and part of each sleeve-like bearing providing a box or receiving space on each lens-stud, a pair of nose-plates, each nose-plate having a portion extending into a receiving space, a pair of springs, each spring having an end-portion clamped between said plates, and a loop on said end-portion encircling the shank of the stud, and each spring having another end-portion in engagement with a part of the nose-bridge, and a screw screwed into the receiving socket of each stud for securing all of said parts in their assembled relation, and each sleeve-like bearing being provided with stops to limit the movements of the parts, substantially as and for the purposes set forth.

9. In a mounting for eye-glasses, the combination, with a nose-bridge, and a lens-support pivotally connected with said nose-bridge, said lens-support being provided with a shank, of a spring consisting of a coil, a pair of upwardly extending end-members, and a loop on one of said end-members, said loop encircling said shank, and the other end-member of said spring bearing upon said nose-bridge, substantially as and for the purposes set forth.

In testimony, that I claim the invention set forth above I have hereunto set my hand this 18th day of October, 1907.

GEORGE J. LOWRES.

Witnesses:
FREDK. C. FRAENTZEL,
ANNA H. ALTER.